United States Patent
Zanella et al.

(10) Patent No.: US 9,230,337 B2
(45) Date of Patent: Jan. 5, 2016

(54) ANALYSIS OF THE DIGITAL IMAGE OF THE INTERNAL SURFACE OF A TYRE AND PROCESSING OF FALSE MEASUREMENT POINTS

(75) Inventors: Jean-Paul Zanella, Clermont-Ferrand Cedex (FR); Claire Moreau, Clermont-Ferrand Cedex (FR); Guillaume Noyel, Clermont-Ferrand Cedex (FR); Yusi Shen, Clermont-Ferrand Cedex (FR)

(73) Assignees: COMPAGNIE GENERALE DES ETABLISSEMENTS MICHELIN, Clermont-Ferrand (FR); MICHELIN RECHERCHE ET TECHNIQUES S.A., Granges-Paccot (CH)

( * ) Notice: Subject to any disclaimer, the term of this patent is extended or adjusted under 35 U.S.C. 154(b) by 0 days.

(21) Appl. No.: 14/112,460

(22) PCT Filed: Mar. 21, 2012

(86) PCT No.: PCT/EP2012/055017
§ 371 (c)(1),
(2), (4) Date: Mar. 12, 2014

(87) PCT Pub. No.: WO2012/143199
PCT Pub. Date: Oct. 26, 2012

(65) Prior Publication Data
US 2014/0270390 A1    Sep. 18, 2014

(30) Foreign Application Priority Data
Apr. 18, 2011  (FR) ...................... 11 53346

(51) Int. Cl.
*G06K 9/00* (2006.01)
*G06T 7/40* (2006.01)
*G06T 5/00* (2006.01)
*G06T 5/30* (2006.01)

(52) U.S. Cl.
CPC ................. *G06T 7/408* (2013.01); *G06T 5/005* (2013.01); *G06T 5/30* (2013.01); *G06T 2207/10028* (2013.01)

(58) Field of Classification Search
CPC ............ G06T 7/408; G06T 5/30; G06T 5/005
See application file for complete search history.

(56) References Cited

U.S. PATENT DOCUMENTS

| 4,951,676 A | 8/1990 | Collet-Billon ........... 128/660.01 |
| 2001/0013823 A1* | 8/2001 | Hatakeyama et al. ......... 340/3.1 |

(Continued)

FOREIGN PATENT DOCUMENTS

WO    WO 03/023699 A1    3/2003

OTHER PUBLICATIONS

R.A. Peters, "A New Algorithm for Image Noise Reduction Using Mathematical Morphology," IEEE Transactions on Image Processing, vol. 4, No. 5, pp. 554-568 (1995)

(Continued)

*Primary Examiner* — Samir Ahmed
(74) *Attorney, Agent, or Firm* — Fitzpatrick, Cella, Harper & Scinto

(57) ABSTRACT

A method for processing an image of a surface of a tire under inspection is described. A three-dimensional digital image of the surface is captured and, for each point of the captured image, a grey-level value corresponding to an elevation is assigned to the point. Utilizing a first morphological operator that uses a rectangular key element, a closure-type first transformation of the image of the surface is carried out. Utilizing a second morphological operator that uses a rectangular key element, an opening-type second transformation of the surface is carried out. For each point of the image, a grey-level value equal to a minimum value between a grey-level value at that point obtained in a preceding step and a grey-level value at that point is assigned, so as to eliminate false measurement points.

8 Claims, 2 Drawing Sheets

(56) References Cited

U.S. PATENT DOCUMENTS

| | | | | |
|---|---|---|---|---|
| 2003/0012453 | A1 | 1/2003 | Kotlikov et al. | 382/275 |
| 2004/0071334 | A1 | 4/2004 | Hassler et al. | 382/141 |
| 2005/0259859 | A1* | 11/2005 | Hassler et al. | 382/141 |
| 2007/0209431 | A1* | 9/2007 | Fujisawa et al. | 73/146 |
| 2008/0218742 | A1* | 9/2008 | Sakoda et al. | 356/73 |
| 2008/0319706 | A1* | 12/2008 | Uffenkamp et al. | 702/150 |
| 2011/0013823 | A1 | 1/2011 | Joly | 382/141 |
| 2011/0018999 | A1* | 1/2011 | Joly et al. | 348/148 |
| 2011/0019903 | A1* | 1/2011 | Joly et al. | 382/141 |
| 2011/0069323 | A1* | 3/2011 | Takahashi et al. | 356/625 |
| 2013/0202156 | A1 | 8/2013 | Joly et al. | 283/104 |
| 2013/0208949 | A1 | 8/2013 | Joly et al. | 382/103 |

OTHER PUBLICATIONS

P. Salembier et al., "Hierarchical Morphological Segmentation for Image Sequence Coding," IEEE Transactions on Image Processing, vol. 3, No. 5, pp. 639-651 (1994).

Z. Tauber et al., "Review and Preview Disocclusion by Inpainting for Image-Based Rendering," IEEE Transactions on Systems, Man, and Cybernetics: Part C: Applications and Reviews, vol. 37, No. 4, pp. 527-540 (2007).

J. Davis et al., "Filling Holes in Complex Surfaces using Volumetric Diffusion," Proceedings of the First International Symposium on 3D Data Processing Visualization and Transmission, 15 pages (2002).

J. Oh et al., "Ranked Directional Morphological Filtering of Impulse Noise in Images," Proceedings of the IEEE International Conference on Acoustics, Speech, and Signal Processing, vol. 6, pp. 2167-2170 (2000).

Li Jie, "Detecting Tire Tread Morphology Based on Laser Triangulation," Master's Thesis (full document), Changchun University of Science and Technology (Feb. 15, 2010).

Dong Jiyang et al., "A Simple Algorithm for Removing Salt and Pepper Noise from Gray-scale Image," Computer Engineering and Applications, vol. 20, pp. 27-29 (2003).

* cited by examiner

ANALYSIS OF THE DIGITAL IMAGE OF THE INTERNAL SURFACE OF A TYRE AND PROCESSING OF FALSE MEASUREMENT POINTS

FIELD OF THE INVENTION

The invention relates to the field of tyre manufacture and more particularly the field of automatic inspection of the surface of a tyre for the purpose of establishing a diagnosis of conformity with preestablished references.

RELATED ART

One of the steps of this process consists, in a known manner, in acquiring the three-dimensional image of the surface of the tyre.

The acquisition of this image is carried out with the aid of means based on the principle of optical triangulation, using for example a 2D sensor coupled with a light source of the laser type.

The topographical image of the tyre surface is in fact a two-dimensional image, called a grey-level image, in which, with every point, i.e. with every pixel (x, y) of the image, is associated a value f(x, y), called grey level, and usually between 0 and 255. This value of grey level may usefully be encoded on 8, or 16 bits for a better dynamic. The grey level represents the altitude of this point relative to the surface. For encoding on 8 bits, the value 255 (white) corresponds to the highest altitude, and the value 0 (black) corresponds to the lowest altitude. As a general rule, the pixels of the image are placed in lines and in columns.

It is however observed that the image of the surface originating from these acquisition means may have false measurement points which it is necessary to identify and to cause to disappear before undertaking the subsequent digital processes. Otherwise, the analysis algorithms could incorrectly consider these zones to be structural anomalies of the tyre to be inspected.

These points as a general rule appear in the zones with high texture, in which the measurement noise is considerable. The camera incorrectly records the information originating from the reflected light instead of considering the information originating from the incident beam. These false measurement points therefore appear to be lighter lines in a relatively uniform image background. This situation occurs in particular when the internal surface of the tyre is considered.

All these points, called false measurement points, are distinguished by the fact that they have positions that are extremely offset relative to the points situated in their immediate environment. "Extremely offset" in this instance means an offset of more than 4 or 5 mm which is therefore markedly distinguished from the variations of profile commonly appearing on the surface of a tyre.

BRIEF DESCRIPTION OF EMBODIMENTS OF THE INVENTION

The object of the invention is to propose a simple processing method making it possible to identify these points, and a method of correcting the digital values describing the surface.

The method for processing the three-dimensional digital image of the external surface of a tyre according to the invention provides for the use of methods for processing an image with the aid of tools of the morphological type.

These methods consist, in a known manner, in modifying the patterns of the image with tools making it possible to erode it or to expand it. In the present case, this amounts to modifying the reliefs of the surface to be inspected.

The morphological operations of erosion and of expansion consist, for each point of an image, in finding the minimum value or the maximum value of grey level of the adjacent points included inside a key element, of given shape and surface area, centred on the point to be analysed and defining a surrounding area of this point. For an erosion, the value at this point then becomes the minimum value and, for an expansion, the value at this point becomes the maximum value. The combination of an erosion followed by an expansion is called an opening, and the combination of an expansion followed by an erosion is called a closure.

According to the invention, the method for processing the three-dimensional digital image of the surface of a tyre contains the steps during which:

the three-dimensional image of the said surface is captured and a value of grey level corresponding to its elevation is assigned to each point of the acquired image, with the aid of a first morphological operator using a rectangular key element, a first transformation of the image of the surface of the closure type is carried out, with the aid of a second morphological operator using a rectangular key element, a second transformation of the surface of the opening type is carried out, at each point of the image, a value of grey level equal to the minimum value between the value of grey level at this point of the image obtained after the second transformation and the value of grey level at this point of the acquired image is assigned so as to eliminate the false measurement points.

Having observed that the false measurement points situated on the internal surface of the tyre have an elongate and narrow shape in the direction perpendicular to the circumferential direction of the tyre, the morphological operator used for the first transformation is preferably a rectangle of which the length in the circumferential direction of the tyre is between 50 and 100 pixels, and the width in the direction perpendicular to the circumferential direction is less than 10 pixels.

For the same reasons, the morphological operator used for the second transformation is preferably a rectangle of which the length in the circumferential direction of the tyre is between 500 and 1000 pixels, and the width in the direction perpendicular to the circumferential direction is less than 10 pixels.

This method applies advantageously to the inspection of the internal surface of the tyre.

BRIEF DESCRIPTION OF THE DRAWINGS

The following description is based on FIGS. 1 to 5 in which.

DETAILED DESCRIPTION OF EMBODIMENTS OF THE INVENTION

Figure 1:
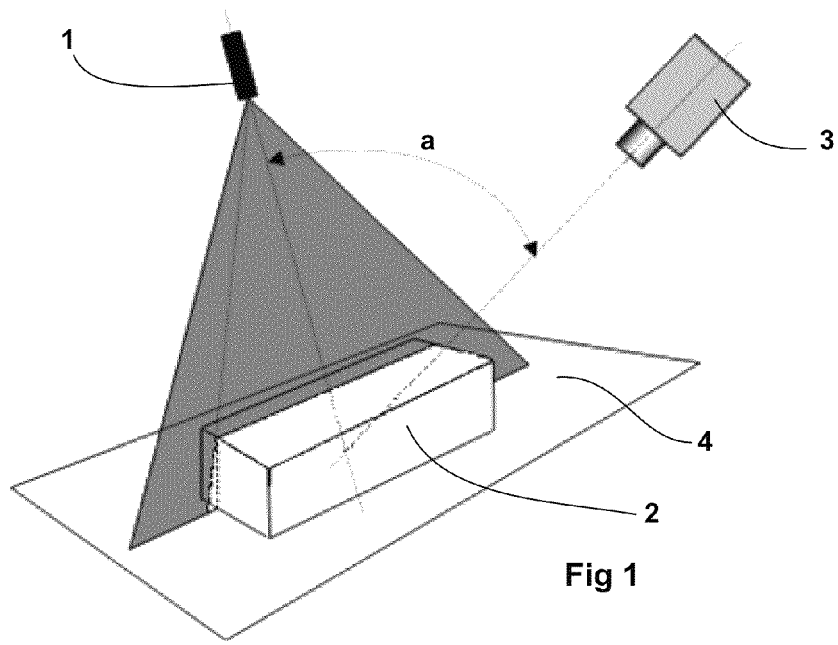
FIG. 1 represents a schematic view of a means for capturing the image of the surface of a tyre.

The acquisition of the image of the surface of a tyre is illustrated in FIG. 1. As an example, this acquisition is carried out with the aid of a slot light emitted by a laser 1, and of a camera 3 capable of capturing the 2D image of the lit surface. The camera is positioned such that its direction of aim forms a given angle a with the beam emitted by the laser source. By triangulation, it is then possible to determine the coordinates of the element of relief 2 relative to the supporting surface 4. As a general rule, the slot light is directed in an axial or radial direction, perpendicular to the circumferential direction corresponding to the direction of rotation imposed on the tyre in order to capture a complete image of its surface. At each point (x, y) of the supporting plane, a value of grey level is assigned that is proportional to the elevation of this point relative to the surface of reference.

Figure 2:
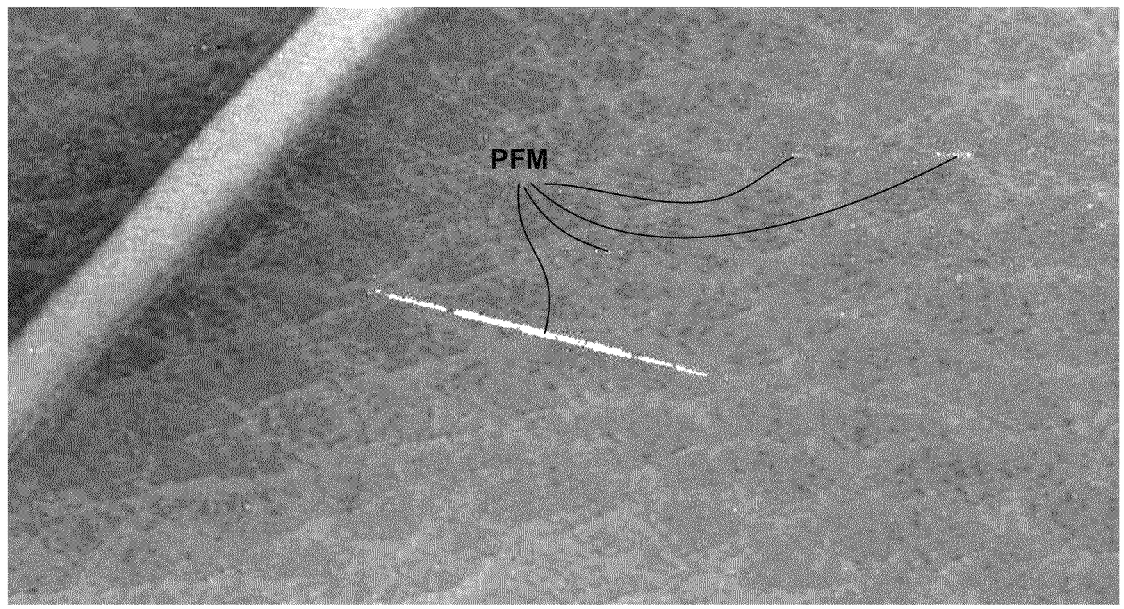
FIG. 2 represents the image of the internal surface of a tyre originating directly from the image capturing means.

FIG. 2 represents the image originating from this capture. The presence of false measurement points, marked PFM, is observed. These points appear as lighter elements of elongate shape. They are therefore situated abnormally above, or even far above, the points of the surface that are close to them and correspond to no particular relief.

This image is then modified with the aid of a first process using a morphological operator of rectangular shape so as to reduce the disruptions in the detection of the false measurement points caused by the presence of textured patterns, and to highlight the false measurement points. The size of this operator is adjusted to the size of the textured patterns that it is sought to filter out. In this instance, good results are obtained with an operator of which the length in the circumferential direction of the tyre is between 50 and 100 pixels, and the width in the direction perpendicular to the circumferential direction is less than 10 pixels.

Figure 3:
FIG. 3 represents the image of the internal surface after processing with the aid of the first transformation.

FIG. 3 is a partial view of the image of the surface of the tyre after the first process has been carried out.

The second process is designed to remove the fine objects appearing in the image originating from the first process, such as the false measurement points. Accordingly, advantage is taken of the elongate shape of these anomalies to adjust the shape of the key element used for the second process which corresponds, in this case, to an opening. A rectangle of which the length in the circumferential direction of the tyre is between 500 and 1000 pixels, and the width in the direction perpendicular to the circumferential direction is less than 10 pixels gives satisfactory results in these circumstances.

Figure 4:
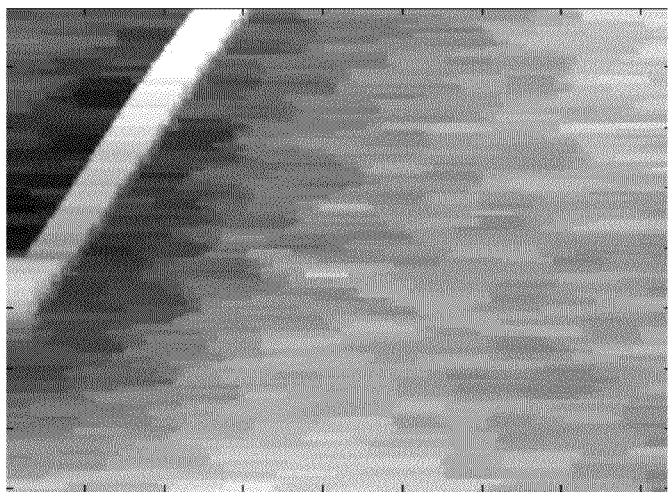
FIG. 4 represents the image of the internal surface after processing with the aid of the second transformation, FIG. 5 Picture 5 represents an image of the internal surface after processing with the aid of the method according to the invention.
Figure 5:
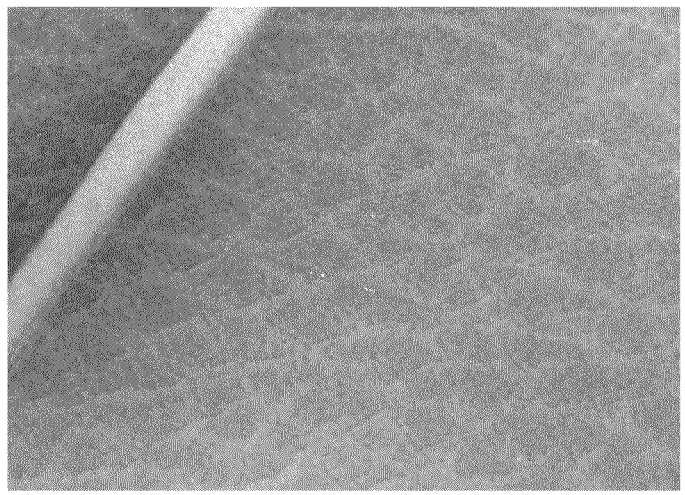

FIG. 4 illustrates the image transformed with the aid of the second process. It can be seen that the zones containing the false measurement points are exempt from abnormal lines.

The last step of the process then consists in assigning to each pixel the value of grey level, and hence an elevation, which corresponds to the minimum value between the value of this grey level at this point of the acquired image and the value of grey level at this point of the image originating from the second transformation. The values of grey level of the obtained image are equal to the values of grey level of the acquired image except for the false measurement points for which the value of grey level corresponds to the value originating from the image transformed with the aid of the second transformation. This process makes it possible to reconstitute at these points a continuity of the texture that is present in the acquired image.

As has been indicated above, this method applies particularly well to the highly textured zones, and in particular to the internal surfaces of the tyre. However, in a non-limiting manner, it is not out of the question to use this same method to refine the images of the external portion of the surface of the tyre when the latter images comprise textured zones.

The invention claimed is:

1. A method for processing an image of a surface of a tyre, the method comprising:
digitally processing an acquired three-dimensional digital image of the surface by using a computer processor to:
for each point of the acquired image, assign a grey-level value level corresponding to an elevation of the point;
utilize a first morphological operator, which uses a rectangular key element, to perform a closure-type first transformation of the image of the surface;
utilize a second morphological operator, which uses a rectangular key element, to perform an opening-type second transformation of the surface; and
for each point of the image, assign a grey-level value equal to a minimum value between a grey-level value of grey level at that point in a preceding step after the second transformation and a grey-level value at that point of the image, so as to eliminate false measurement points,
wherein a result of the processing of the acquired image is used to determine where the tyre is in compliance with a reference.

2. The method according to claim 1, wherein the first morphological operator used for the first transformation is a rectangle of which:
a length in a circumferential direction of the tyre is between 50 and 100 pixels, and
a width in a direction perpendicular to the circumferential direction is less than 10 pixels.

3. The method according to claim 1, wherein the second morphological operator used for the second transformation is a rectangle of which:
a length in a circumferential direction of the tyre is between 500 and 1000 pixels, and
a width in a direction perpendicular to the circumferential direction is less than 10 pixels.

4. The method according to claim 2, wherein the second morphological operator used for the second transformation is a rectangle of which:
a length in a circumferential direction of the tyre is between 500 and 1000 pixels, and
a width in a direction perpendicular to the circumferential direction is less than 10 pixels.

5. The method according to claim 1, wherein the acquired image is that of an internal surface of the tyre.

6. The method according to claim 2, wherein the acquired image is that of an internal surface of the tyre.

7. The method according to claim 3, wherein the acquired image is that of an internal surface of the tyre.

8. The method according to claim 4, wherein the acquired image is that of an internal surface of the tyre.

* * * * *